(12) United States Patent
Becker

(10) Patent No.: US 8,296,822 B2
(45) Date of Patent: Oct. 23, 2012

(54) STATE-UPDATING AUTHORIZATION

(75) Inventor: Moritz Becker, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 12/502,909

(22) Filed: Jul. 14, 2009

(65) Prior Publication Data

US 2011/0016507 A1    Jan. 20, 2011

(51) Int. Cl.
*G06F 21/00* (2006.01)
(52) U.S. Cl. ............... 726/1; 726/4; 726/21; 713/182; 709/229
(58) Field of Classification Search .............. 709/229; 713/182; 726/1, 4, 17, 21
See application file for complete search history.

(56) References Cited

U.S. PATENT DOCUMENTS

| | | | |
|---|---|---|---|
| 7,076,557 B1 * | 7/2006 | LaMacchia et al. | 709/229 |
| 7,353,533 B2 * | 4/2008 | Wright et al. | 726/1 |
| 7,434,257 B2 | 10/2008 | Garg et al. | |
| 2008/0065899 A1 | 3/2008 | Dillaway et al. | |
| 2008/0066160 A1 | 3/2008 | Becker et al. | |
| 2008/0066175 A1 | 3/2008 | Dillaway et al. | |
| 2008/0086643 A1 | 4/2008 | Balasubramanian et al. | |
| 2008/0178285 A1 * | 7/2008 | Perlman et al. | 726/21 |
| 2010/0188975 A1 * | 7/2010 | Raleigh | 370/230.1 |

OTHER PUBLICATIONS

Abadi, et al., "A calculus for access control in distributed systems", ACM Transactions on Programming Languages and Systems, 15(4):706-734, 1993.

Abiteboul, et al., "Foundations of Databases", retrieved from the internet at <<http://www.aueb.gr/users/vassalos/mpla-db/bookahv/Frontmatter.pdf>>, 1995.

Bandara, et al., "Using event calculus to formalise policy specification and analysis", in 4th IEEE International Workshop on Policies for Distributed Systems and Networks, p. 26, 2003.

Barth, et al., "Managing digital rights using linear logic", in 21st IEEE Symposium on Logic in Computer Science, pp. 127-136, 2006.

Becker, et al., "A logic for state-modifying authorization policies", in 12th European Conference on Research in Computer Security (ESORICS), vol. 4734 of Lecture Notes in Computer Science, pp. 203-218, 2007, retrieved from the internet at <<http://research.microsoft.com/pubs/70421/tr-2007-32.pdf>>.

Becker, et al., "Cassandra: Distributed Access Control Policies with Tunable Expressiveness", 2004.

Becker, et al., "Cassandra: Flexible Trust Managment, Applied to Electronic Health Records", in IEEE Computer Security Foundations Workshop (CSFW), pp. 139-154, 2004, retrieved from the internet at <<http://citeseerx.ist.psu.edu/viewdoc/download;jsessionid=2D634C9D1BD571010DD93BA8865B2972?doi=10.1.1.4.889&rep=rep1&type=pdf>>.

(Continued)

*Primary Examiner* — Hadi Armouche
(74) *Attorney, Agent, or Firm* — Lee & Hayes, PLLC

(57) ABSTRACT

An authorization system includes an authorization node, a storage device and a reference monitor. The authorization node executes an authorization policy, and the storage device stores an authorization state associated with the authorization policy. Requests for access to a secured resource are received at the reference monitor, and the reference monitor queries the authorization node, which uses the authorization policy to determine whether to grant access to the secured resource based on a rule having at least one access condition. The rule, executed as part of the authorization policy on the authorization node, is configured to update all the entries in the authorization state for which an update condition is met.

19 Claims, 6 Drawing Sheets

OTHER PUBLICATIONS

Becker, "Cassandra: Flexible Trust Management and its Application to Electronic Health Records", Technical Report UCAM-CL-TR-648, University of Cambridge, Computer Laboratory, 2005, retrieved from the internet at <<http://www.cl.cam.ac.uk/techreports/UCAM-CL-TR-648.pdf>>.
Becker, et al., "Design and Semantics of a Decentralized Authorization Language", in IEEE Computer Security Foundations Symposium (CSF), 2007, retrieved from the internet at <<http://ieeexplore.ieee.org/stamp/stamp.jsp? arnumber=04271637>>.
Becker, et al., "Information governance in NHS's NPfIT: A Case for Policy Specification", International Journal of Medical Informatics, 76(5-6), 2007, retrieved from the internet at <<http://research.microsoft.com/pubs/76078/becker06ijmi.pdf>>.
Blaze, et al., "The Role of Trust Management in Distributed Systems Security", in Secure Internet Programming, pp. 185-210, 1999.
Bonner, et al., "An Overview of Transaction Logic", Theoretical Computer Science, 133(2):205-265, 1994, retrieved from the internet at <<http://citeseerx.ist.psu.edu/viewdoc/download?doi=10.1.1.50.5253&rep=rep1&type=pdf >>.
Bonner, et al., "Transaction logic programming", Technical Report Technical Report CSRI-323, Computer Systems Research Institute, University of Toronto, 1995, retrieved from the internet at <<http://http.cs.toronto.edu/pub/bonner/papers/transaction.logic/abstracts/report.ps.>>.
Ceri, et al., "What you always wanted to know about Datalog (and never dared to ask)", IEEE Transactions on Knowledge and Data Engineering, 1(1):146-166, 1989, retrieved from the internet at <<http://ieeexplore.ieee.org/stamp/stamp.jsp?arnumber=00043410>>.
Chen, et al., "Incorporating dynamic constraints in the flexible authorization framework", ESORICS 2004, LNCS 3193, 99. 1-16, retrieved from the internet at <<http://www.springerlink.com/content/nvkyxp38qqew0k47/fulltext.pdf>>.
Damianou, et al., "The Ponder policy specification language", in International Workshop on Policies for Distributed Systems and Networks, pp. 18-38, 2001.
Debray, "Unfold Fold Transformations and Loop Optimization of logic programs", in Proceedings of the SIGPLAN 1988. Conference on Programming, Language Design and Implementation, Atlanta Georgia, Jun. 22-24, 1988.
Dougherty, et al., "Obligations and their interaction with programs", in 12th European Symposium on Research in Computer Security (ESORICS), vol. 4734 of Lecture Notes in Computer Science, pp. 375-389, 2007.
Dougherty, et al., "Specifying and reasoning about dynamic access-control policies", in Automated Reasoning, Third International Joint Conference, IJCAR 2006, pp. 632-646, 2006.
Edelkamp, et al., "MIPS: The Model-Checking Integrated Planning System", AI Magazine, 22(3):67-72, 2001.
Ellison, et al., "SPKI certificate theory", RFC 2693, Sep. 1999.
Erol, et al., "Complexity, decidability and undecidability results for domain-independent planning", Artificial Intelligence, 76(1-2):75-88, 1995.
Fikes, et al., "STRIPS: A New Approach to the Application of Theorem Proving to Problem Solving", Artificial Intelligence, pp. 189-208, 1971.
Fox, et al., "PDDL2.1: An Extension to PDDL for Expressing Temporal Planning Domains", Journal of Artificial Intelligence Research, 20, 2003.
Gurevich, et al., "DKAL: Distributed-Knowledge Authorization Language", in IEEE Computer Security Foundations Symposium (CSF), pp. 149-162, 2008.
Harrison, et al., "Protection in operating systems", Communications of the ACM, 19(8):461-471, 1976.
Hoffman, et al., "The FF planning system: Fast plan generation through heuristic search", Journal of Artificial Intelligence Research, 14:253-302, 2001.
"Integrated Care Records Service: Output Based Specification", National Health Service, UK, version 2, 2003, retrieved from the internet at <<http://www.eprarms.com/images/ICRS_Spec.pdf>>.
Jagadeesan, et al., "Timed constraint programming: a declarative approach to usage control", in International Conference on Principles and Practice of Declarative Programming, pp. 164-175, 2005.
Jim, "SD3: A trust management system with certified evaluation", in IEEE Symposium on Security and Privacy, pp. 106-115, 2001.
Kowalski, et al., "A Logic-based calculus of events", New Generation Computing, 4:67-95, 1986.
Kupferschmid, et al., "Adapting an AI planning heuristic for directed model checking", in 13th International SPIN Workshop, vol. 3925 of Lecture Notes in Computer Science, pp. 35-52, 2006.
Li, et al., "A Logic-based Knowledge Representation for Authorization with Delegation", Extended abstract, Proceedings of the 12th IEEE Computer Security Foundations Workshop, Jul. 1999, retrieved from the internet at <<http://ieeexplore.ieee.org/stamp/stamp.jsp?tp=&isnumber=&arnumber=779771>>.
Li, et al., "A practically implementable and tractable delegation logic", in IEEE Symposium on Security and Privacy, pp. 27-42, 2000.
Li, et al., "Beyond proof-of-compliance: Security analysis in trust management", Journal of the ACM, 52(3):474-514, 2005.
Li, et al., "Design of a role-based trust management framework", in IEEE Symposium on Security and Privacy, pp. 114-130, 2002.
Lifschitz, "Foundations of logic programming", Principles of Knowledge Representation, pp. 69-127, 1996.
McCarthy, et al., "Some philosophical problems from the standpoint of artificial intelligence", in Machine Intelligence, pp. 463-502, 1969.
"Prover9 and Mace4", Version Dec. 2007, <<http://www.cs.unm.edu/~mccune/prover9>>.
Przymusinski, "On the Declarative Semantics of Deductive Databases ane Logic Programs", Foundations of deductive databases and logic programming, pp. 193-216, 1988.
Sandhu, et al., "The ARBAC97 model for role-based administration of roles: preliminary description and outline", in 2nd ACM Workshop on Role-Based Access Control, pp. 41-54, 1997, retrieved from the internet at <<http://portal.acm.org/ft_gateway.cfm?id=266752&type=pdf&coll=GUIDE&dl=GUIDE&CFID=33122636&CFTOKEN=41255339>>.
Sasturkar, et al., "Policy analysis for administrative role based access control", in IEEE Computer Security Foundations Workshop, pp. 124-138, 2006.
Siewe, et al., "Dynamic Access Control Policies and Web-Service Composition", retrieved from the internet at <<http://www.cse.dmu.ac.uk/STRL/research/publications/pubs/2005/2005-4.ps>>.
Simon, et al., "Separation of Duty in Role-based Environments", 1997 IEEE, retrieved from the internet at <<http://ieeexplore.ieee.org/stamp/stamp.jsp?tp=&arnumber=596811&isnumber=13078>>.
Stoller, et al., "Efficient policy analysis for administrative role based access control", in 14th ACM Conference on Computer and Communications Security (CCS). ACM Press, 2007.
Varadharajan, et al., "Authorization in Enterprise-wide Distributed System: A Practical Design Application", retrieved from the internet at <<http://ieeexplore.ieee.org/stamp/stamp.jsp?arnumber=00738614>>, 1998.
Weld, "Recent advances in AI planning", AI Magazine, 20(2):93-123, 1999.
Yague, et al., "A Semantic Approach for Access Control in Web Services", retrieved from the internet at <<http://www.Icc.uma.es/~yague/SemanticsBasedAccessControl/EuroWeb'02.html>>.
Yu, et al., "A Heterogeneous Authorization Policy Management Mechanism for Grid Environments", 2007 International Conference on Multimedia and Ubiquitous Engineering (MUE 2007), retrieved from the internet at <<http://ieeexplore.ieee.org/stamp/stamp.jsp?arnumber=04197303>>.
Yu, et al., "ARSL: A Language for Authorization Rule Specification in Software Security", Proceedings of the 11th IEEE Symposium on Computers and Communications (ISCC 2006), retrieved from the internet at <<http://ieeexplore.ieee.org/stamp/stamp.jsp?arnumber=01691007>>.
Zhang, et al., "Synthesising verified access control systems through model checking", Journal of Computer Security, 16(1):1-61, 2008.

* cited by examiner

STATE-UPDATING AUTHORIZATION

BACKGROUND

Authorization policies are used to control access to security-critical services in distributed environments such as computer networks. Such authorization policies can be defined using associated authorization languages, which provide flexibility and expressiveness in the policy specification. These languages allow the authorization policy to be written explicitly as a list of declarative rules.

Requests for access to security-critical services are received at a reference monitor, which is a service serving requests from user terminals. The reference monitor queries an authorization node executing the authorization policy. Access for the user is granted only if the authorization node evaluating the policy succeeds in proving that the request complies with the local policy and any current authorization state. The authorization state is a database containing relevant environmental facts including knowledge obtained from authorization credentials.

However, often the reference monitor not only allows or denies access, but also updates the authorization state after a successful request. In a role-based policy, for instance, the fact that a user has activated some role is inserted into the authorization state after a successful role activation request. Similarly, the fact can be removed from the authorization state if the role is deactivated. There are many authorization policies that depend on past interactions; relevant events are therefore stored in the authorization state.

Consider, for instance, the following policy rule (part of the authorization policy executed on the authorization node) for initiating a payment:

```
canInitPayment(x,p) :
    Bank says x is a manager,
    not(∃y(Bank says y has initiated p))
```

According to this policy fragment, if x is a manager, then x can initiate a payment p, provided that payment has not been already initiated. Therefore, the precondition for granting the action checks for the absence of 'has initiated' facts in the authorization state. For this scheme to work as intended, a granted payment initiation action has the side effect of inserting a 'has initiated' fact into the authorization state. Such effects are hard-coded into the reference monitor, for example as illustrated in pseudocode below.

```
handleRequests(Action a, Params ps) {
    if (Policy.permits(a, ps) {
        if (a=='canInitPayment') {
            Policy.insert(ps[0] has initiated ps[1]);
        } [...]
        execute(a, ps);
    } [...]
}
```

In the example above, a is the 'canInitPayment' rule defined above, ps[0] is the user x, and ps[1] is the payment p. This results in the reference monitor inserting the fact 'x has initiated p' into the authorization state.

As shown, updates to the authorization state use the functionality of a programming language, and are hard-coded into the reference monitor. This leads to poor maintainability, as changes to the authorization policy can result in corresponding changes being required in the compiled programs executed on the reference monitor.

The embodiments described below are not limited to implementations which solve any or all of the disadvantages of known authorization systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

State-updating authorization is described. In an embodiment, an authorization system comprises an authorization node, a storage device and a reference monitor. The authorization node executes an authorization policy, and the storage device stores an authorization state associated with the authorization policy. Requests for access to a secured resource are received at the reference monitor, and the reference monitor queries the authorization node, which uses the authorization policy to determine whether to grant access to the secured resource based on a rule having at least one access condition. The rule, executed as part of the authorization policy on the authorization node, is configured to update all the entries in the authorization state for which an update condition is met.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
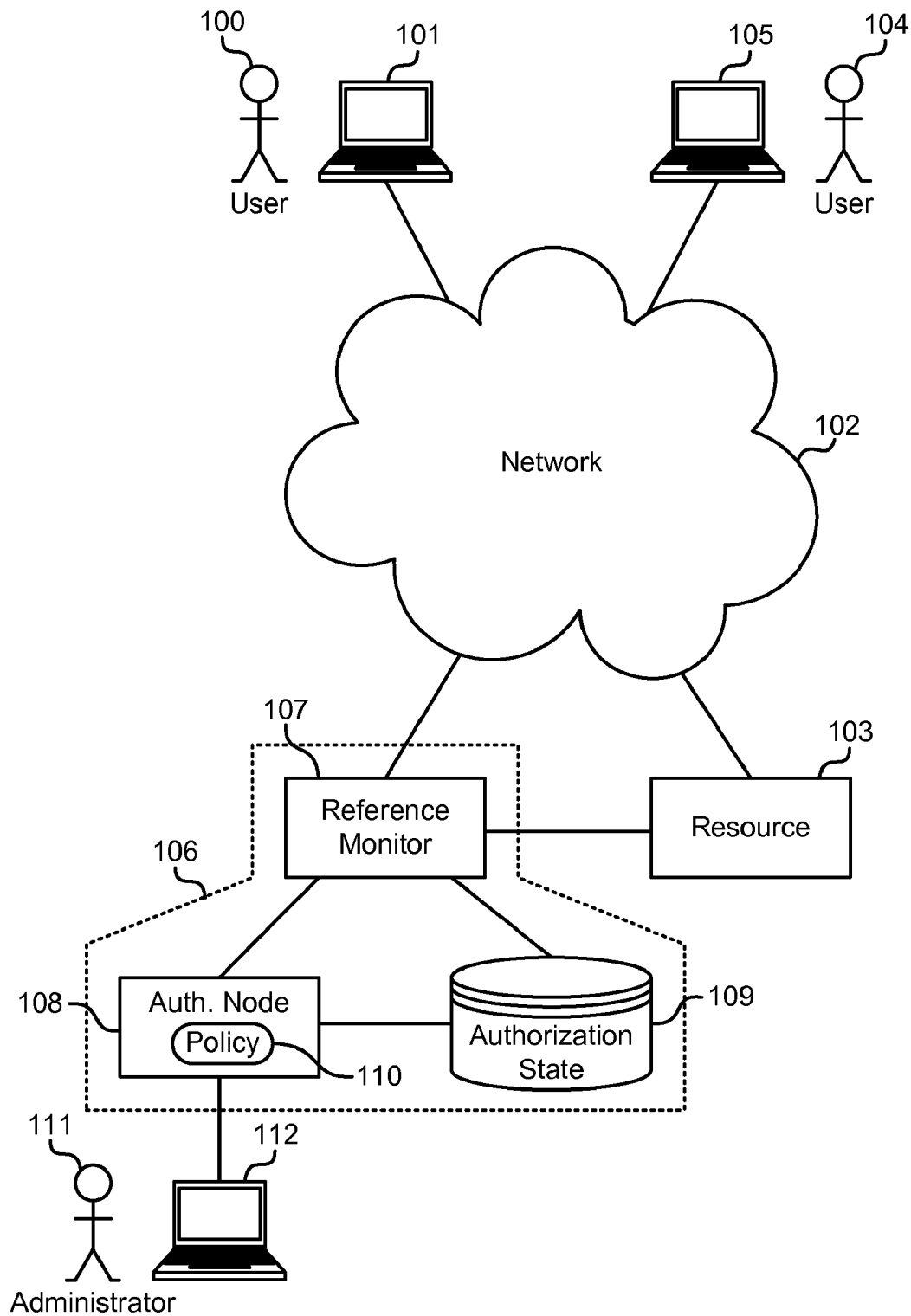
FIG. 1 illustrates a communication system enabling users to gain access to a secured resource.

FIG. 1 illustrates a system in which one or more users wish to gain access to a secured resource. In the example of FIG. 1, a first user 100 operates a first user terminal 101 connected to a communication network 102. The communication network 102 can comprise, for example, a wide area network such as the internet, or a local area network. The first user 100 wishes to gain access to a resource 103 connected to the communication network 102. However, the resource 103 is secured such that the first user 100 requires authorization before being able to access the resource 103. The resource 103 can be, for example, a document stored on a server, data stored in a database, a webpage, an executable program, processing resources or another communication network.

FIG. 1 also shows a second user 104 operating a second user terminal 105 connected to the communication network 102. The second user can also request access to the secured resource 103. Note that whilst FIG. 1 only illustrates two users, any number of users can be connected to the communication network 102 and request access to the secured resource 103.

Authorization to access the resource 103 is provided by an authorization system 106. The authorization system 106 comprises a reference monitor 107, an authorization node 108 and an authorization state 109.

The reference monitor 107 is connected to the communication network 102. The reference monitor 107 is a service arranged to serve access requests from the user terminals over the communication network 102. In other words, the reference monitor 107 operates as a front-end to the authorization system 106 and mediates the requests from the users for access to the resource 103.

The authorization node 108 is connected to the reference monitor 107. The authorization node 108 is executing an authorization policy 110. The authorization policy 110 comprises a list of rules for determining whether to grant a user access to the resource 103, and under what conditions. The authorization policy 110 is defined using a state-updating authorization query language, as described in more detail hereinafter. The authorization policy 110 is defined and maintained by an administrator 111 operating an administration terminal 112 that can communicate with the authorization node 108 (directly or via the communication network 102).

The authorization state 109 is a database connected to the authorization node 108 such that the authorization policy 110 can access the authorization state 109. The authorization state 109 can also be connected to the reference monitor 107. The authorization state 109 comprises a plurality of entries that define the state of the authorization policy—that is, stored data relating to the authorization policy, authorization requests that have been made and by whom, and other authorization credentials.

Note that the reference monitor 107 and the authorization policy 110 can be implemented on physically separate network elements. Alternatively, the reference monitor 107 and the authorization policy 110 can be implemented on a common network element (e.g. both on the authorization node 108). However, the reference monitor 107 and the authorization node 108 are separate functional elements, and are implemented in differing programming languages. Note that, in alternative examples, the user 100 can be directly interacting with the hardware that is executing the reference monitor 107, in which case network 102 and user terminal 101 need not be present.

Figure 2:
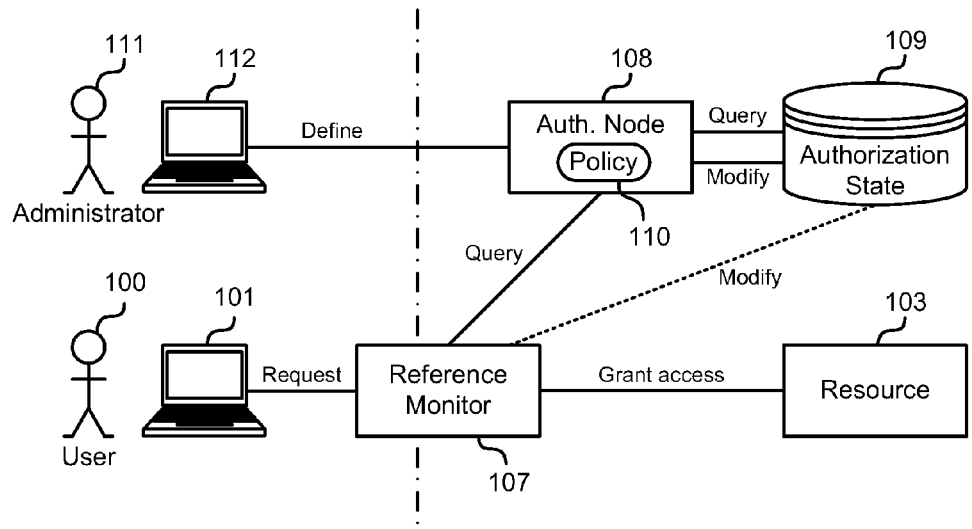
FIG. 2 illustrates an authorization system with a state-updating authorization policy.

Reference is now made to FIG. 2, which illustrates the functional operation of the authorization system 106. The user 100 requests access to the resource 103 by using the user terminal 101 to send a request message to the reference monitor 107. Responsive to receiving the request message, the reference monitor 107 queries the authorization node 108 to ask whether the user 100 is to be granted access. The query to the authorization node 108 can comprise data regarding the requested resource, the type of action that the user wishes to perform on the resource (such as initiating some payment), the user 100 and/or the user terminal 101.

The authorization node 108 evaluates the request by applying the authorization policy 110. To do this, the current authorization state associated with the authorization policy 110 is determined by querying the database storing the authorization state 109. For example, considering the example given hereinabove, if the policy is determining whether to enable a user to initiate a payment, the current authorization state is queried to determine whether the payment has already been initiated. Further additional examples are also provided hereinafter.

The authorization policy 110 comprises one or more rules which are evaluated in light of the query and the authorization state to determine whether to authorize the user. The rules can comprise access conditions, which are described in more detail hereinafter. The result of the evaluation of the rules is provided to the reference monitor 107 by the authorization node 108. The reference monitor 107 can then grant access to the resource 103 for the user 100 (or deny access, if appropriate).

As mentioned hereinbefore, following evaluation of the authorization policy 110, it is often appropriate to update the authorization state 109 to reflect the result of the evaluation. For example, as described in the example above, if it is determined that the user is authorized to initiate a payment, then the authorization state 109 is updated to show that this payment has now been initiated. Storing this information therefore prevents the payment being initiated again in the future.

In conventional authorization systems, the updating of the authorization state is performed by the reference monitor 107, and a programming language is used to define the update operation. This is illustrated by the dashed line in FIG. 2. However, as stated, requiring the reference monitor to modify the authorization state leads to poor maintainability, as any changes to the authorization policy 110 can result in corresponding changes being required in the compiled programs executed on the reference monitor.

To address this, the authorization policy 110 has been extended by using a policy language that enables authorization state updates to be performed as part of the evaluation of the authorization policy. Therefore, authorization state updates are factored out from the reference monitor 107. This enables the authorization node 108 to update the authorization state 109 directly, thereby improving maintainability because changes to the authorization policy can also incorporate changes to the interactions with the authorization state. The reference monitor code can therefore remain the same, and does not need to be changed when the authorization policy is changed.

Figure 3:
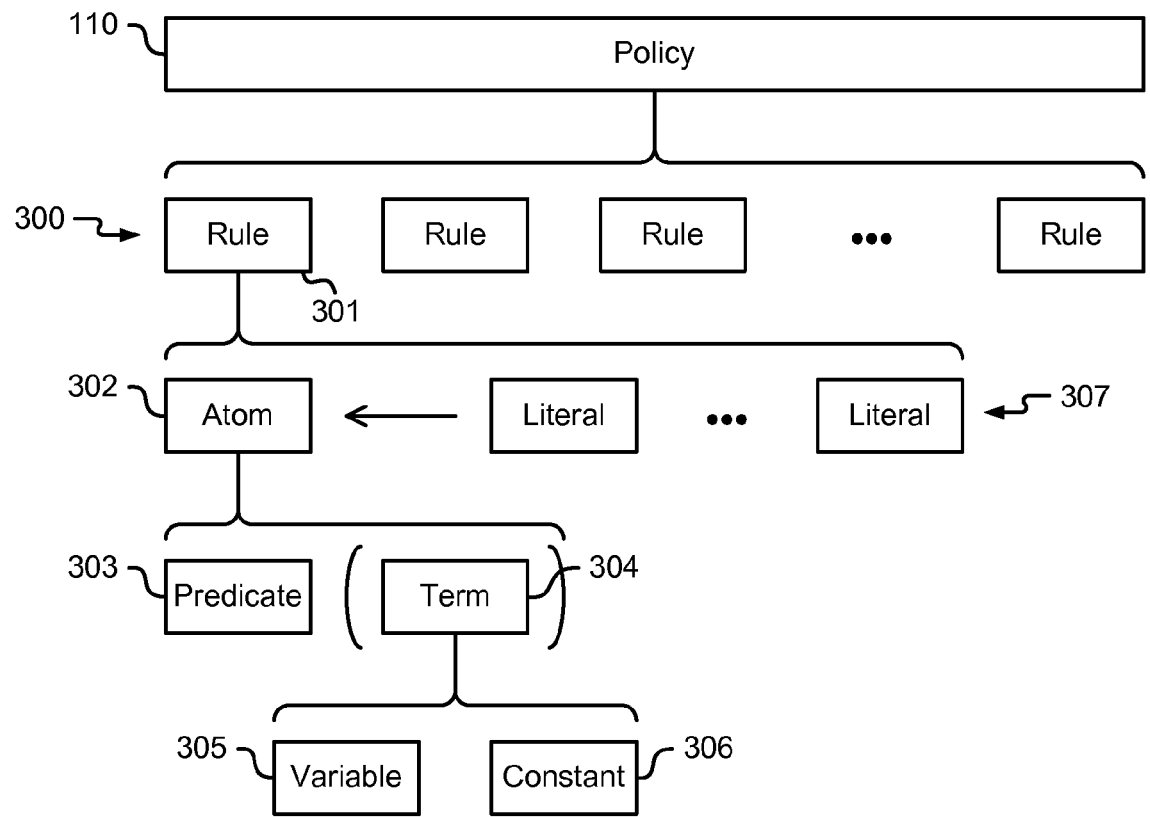
FIG. 3 illustrates a schematic structure of an authorization policy.

Reference is now made to FIG. 3, which illustrates a high-level schematic structure of the state-updating authorization policy, and how it is defined using a dynamic authorization policy language. The authorization policy 110 comprises one or more rules 300. The rules define the access conditions that are to be met for a particular authorization to be granted, and the effects that are made to the authorization state.

Each rule, for example rule 301, is defined using the following format. An atom 302 to the left of a left-pointing arrow defines the 'head' of the rule 301. The atom 302 is formed of a predicate 303 applied to a term 304. The term can comprise one or more variables 305 or constants 306. The atom 302 forming the head of the rule can be considered to define the name (the predicate) and parameters of the rule. For example, in the case of the rule canInitPayment(x,p) above, canInitPayment is the predicate and x and p are the terms.

To the right of the left-pointing arrow in the rule 301 are one or more literals 307. These literals 307 define the 'body' of the rule. The literals 307 comprise atoms of a similar structure to atom 302. The literals 307 are conjoined, that is joined by AND operators, such that each of them must hold true for the head atom 302 to hold true. In other words, the literals define one or more access conditions that are to be met for the rule to be met. The literals 307 can also define updates that are made to the authorization state 109.

A definition of the language syntax used to construct the state-updating authorization policy is now described. The authorization policy is a set of declarative rules built from predicates. The language distinguishes between two types of rules: dynamic rules and static rules. Dynamic rules result in authorization state updates. Specifically, dynamic rules define the access conditions and authorization state updates associated with actions. Hence, dynamic rules are also called action definitions. For example, a user Bob's request to read a file can be represented by dynamic rule: read(Bob, File), and his request to initiate a payment by: init(Bob, payment). Static rules, on the other hand, do not update the authorization state.

As shown with reference to FIG. 3, the rules are built from predicates. Distinctions are made between several types of predicate in the authorization policy, as illustrated with reference to FIG. 4. A predicate 303 can be a static predicate 400 or a dynamic predicate 401. The set of predicates 303 is denoted Pred, the set of static predicates 400 is denoted $Pred^{st}$, and the set of dynamic predicates 401 is denoted $Pred^{dy}$. Evaluating a static predicate has no effect on the authorization state, whereas evaluating a dynamic predicate can affect the authorization state.

Dynamic predicates 401 represent actions (or access requests), e.g. action definitions of the form init(Bob, payment). Static predicates 400 can be extensional predicates 402 (the set of which are denoted $Pred^{ex}$) or intensional predicates 403 (the set of which are denoted $Pred^{in}$). Extensional predicates 402 represent the current authorization state, and are thus facts that can change over time. Updates to the authorization state apply to extensional atoms (i.e. an extensional predicate applied to a term). For example, the extensional atom initiated(Bob, payment) can represent the fact that Bob has initiated that particular payment in the past. Therefore, the extensional atoms make up the authorization state, and the authorization state database is known as an extensional database. Intensional predicates 403 are used to define more complex relations over the extensional atoms in the authorization state. Intensional predicates are not directly inserted or removed by state updates. Therefore, these can then be used to construct the conditions inside dynamic rules.

Figure 4:
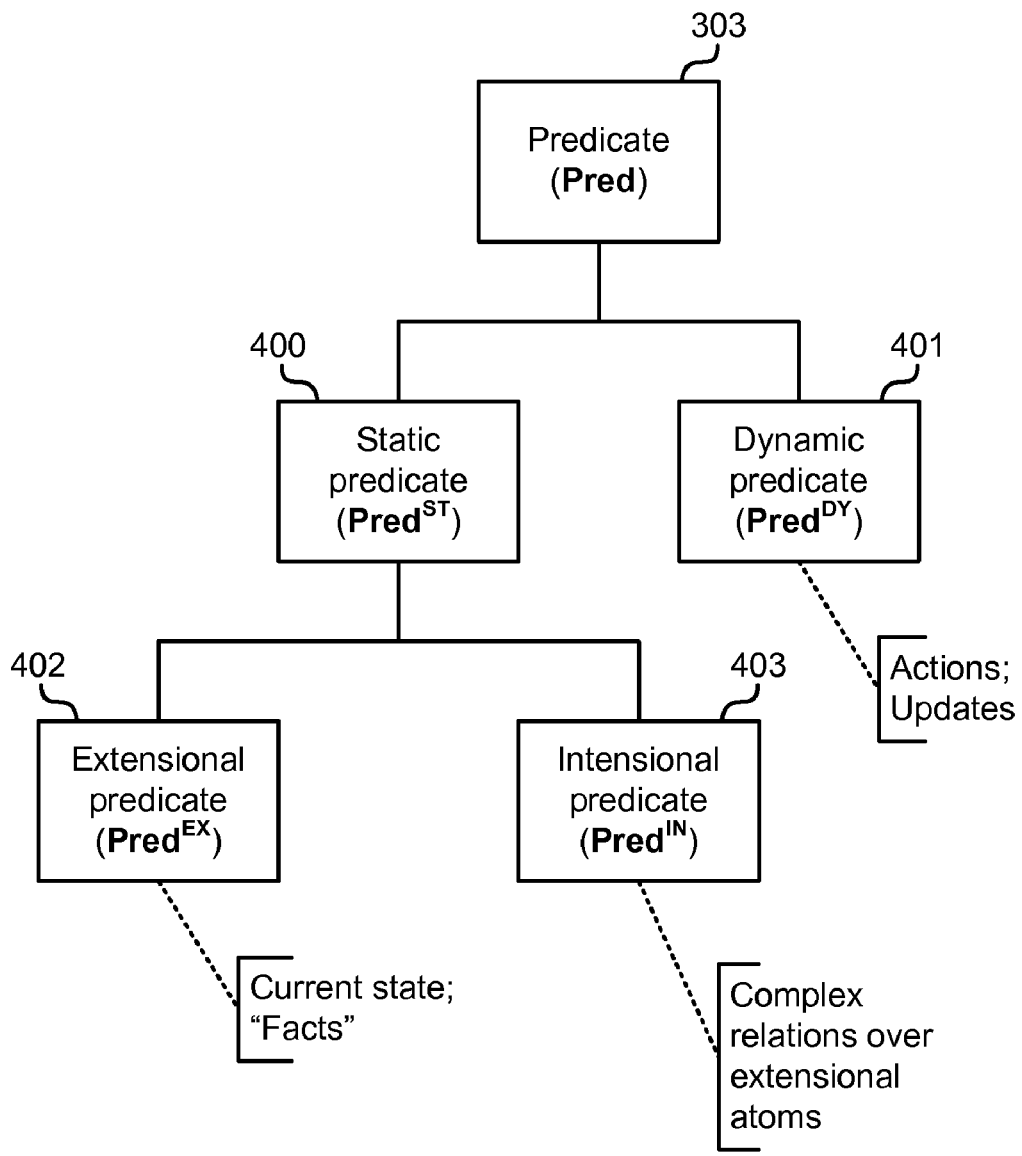
FIG. 4 illustrates predicate types used in the authorization policy.

A formal definition is as follows. The notation $\vec{X}$ is used to denote a (possibly empty) sequence of items $X_1, \ldots, X_n$. The syntax is based on a first order function-free signature $\Sigma=(\text{Const}, \text{Pred})$ with (possibly infinitely many) constants Const, and a finite set of predicate names Pred. As shown in FIG. 4, the predicates can be divided into two disjoint sets: static ($Pred^{st}$) and dynamic ($Pred^{dy}$) predicate names. The static predicate names can be further divided into two disjoint sets: intensional ($Pred^{in}$) and extensional ($Pred^{ex}$) predicate names. This induces the set of atoms (predicate names applied to expressions of appropriate arity), denoted as Atom, which can also be divided into static ($Atom^{st}$) and dynamic ($Atom^{dy}$) atoms, and the static ones correspondingly into intensional atoms ($Atom^{in}$) and extensional atoms ($Atom^{ex}$).

The rules 300 are constructed as follows. A dynamic rule ($R^{dy}$) is defined by:

$$\langle R^{dy}\rangle ::= A^{dy} \leftarrow \vec{L}$$

Where $A^{dy}$ is a dynamic atom belonging to $Atom^{dy}$ (i.e. $A^{dy} \in Atom^{dy}$), and $\vec{L}$ is a sequence of literals. In other words, a dynamic rule comprises a dynamic atom as the head of the rule, and a sequence of literals as the body. If each literal in the body is true then the head atom is true.

A static rule ($R^{st}$) is defined by:

$$\langle R^{st}\rangle ::= A^{in} \leftarrow \vec{L}^{st}$$

Where $A^{in}$ is an intensional atom belonging to $Atom^{in}$ (i.e. $A^{in} \in Atom^{in}$), and $\vec{L}^{st}$ is a sequence of static literals. In other words, a static rule comprises an intensional atom as the head of the rule, and a sequence of static literals as the body. Again, if each literal in the body is true then the head atom is true.

A literal is defined as:

$$\langle L\rangle ::= L^{st} | L^{dy}$$

In other words, a literal is either a static literal or a dynamic literal.

A dynamic literal is defined by:

$$\langle L^{dy}\rangle ::= A^{dy}$$

$$| +\{p^{ex}(\vec{x}):A^{st}\}$$

$$| -\{p^{ex}(\vec{x}):A^{st}\}$$

Where $\vec{x}$ is a sequence of distinct variables, $p^{ex}$ is an extensional predicate (i.e. $p^{ex} \in Pred^{ex}$), and $A^{st}$ is a static atom belonging to $Atom^{st}$ (i.e. $A^{st} \in Atom^{st}$). A dynamic literal is therefore either a dynamic atom or is of the form $\pm\{A_1:A_2\}$. A dynamic literal of the form $\pm\{A_1:A_2\}$ is called an update. Such a dynamic literal inserts or removes (depending on whether the + or − is present) all atoms $A_1$ into or from the authorization state for which atom $A_2$ currently holds true. This is known as a conditional bulk update. In this context, $A_2$ is called the guard, and defines an update condition, i.e. a condition that is to be met for the update to the authorization state to be performed. Note that this update condition is defined as part of the update command, and can therefore be defined separately from other access conditions in the rule that are used to determine whether to grant access to the resource. Also note that this update command can insert a plurality of atoms into the authorization state.

Therefore, the dynamic literal $+\{A_1:A_2\}$ inserts all extensional atoms $A_1$ into the authorization state for which static atom $A_2$ holds true. Similarly, the dynamic literal $-\{A_1:A_2\}$ retracts all extensional atoms $A_1$ from the authorization state for which static atom $A_2$ holds true.

A static literal is defined by:

$$\langle L^{st}\rangle ::= A^{st} | \neg A^{st}$$

Therefore, a static literal comprises either a static atom or a negated static atom. Negation is discussed in more detail below.

The authorization state is denoted B, and is a set of ground (i.e. variable-free) extensional atoms. The policy is a finite set of rules and is denoted P. The free variables of a syntactic phrase W are denoted by fv(W). The definition is standard (all variables are free variables) apart from the case of updates: $fv(\pm\{p(\vec{x}):A\})=fv(A)\setminus\vec{x}$. Hence, the variables $\vec{x}$ are implicitly bound by the set builder construction. A phrase is ground if no variables occur in it, and closed if it does not have any free variables.

The evaluation of a dynamic atom defined by a rule instance $A \leftarrow \vec{L}$ succeeds if all $L \in \vec{L}$ can be deduced from left to right. If L is static, it is recursively deduced from the policy and the intermediate authorization state at that point in time. The evaluation of a static rule does not affect the authorization state.

If, on the other hand, L is dynamic, it is executed, but its effects are not committed until all the literals in the top-level rule (when rules are nested) have been evaluated and hold true. In other words, the effects of an update $\pm \{A_1:A_2\}$ on the authorization state are internally performed straight away, but not committed and made externally visible until the top-level query has been evaluated successfully. If the query does not succeed, then no effect is committed, hence the state is as before (or equivalently, all internal updates are rolled back invisibly). Therefore, the effects of an update are actually performed immediately (but invisibly and without commitment), and when a rule comprises other nested state-updating rules, the effects are not committed on a rule-by-rule basis, but only after execution of the top-most query. Hence, the effects of executing a dynamic atom (an action) are atomic.

The state-updating authorization policy language features negation as failure. This means that ¬A holds true if A cannot be deduced. Negation as failure is useful, as many dynamic policies are non-monotonic; in conjunction with retractions, it allows conditions that check for the absence of certain facts in the authorization state. Negation can be problematic in the context of a language with recursive rules, as it leads to non-unique minimal models. For this reason, the policies are restricted to be stratified. This means that negation is separated from recursion. Therefore, the policy can be considered to be a stratified set of rules.

More formally, a set of rules P is stratified if and only if there exists a function σ which gives the stratification number from Pred such that, for all rules $p(\vec{t}) \leftarrow \vec{L}$ in P and all literals L occurring in $\vec{L}$ (possibly within an update), the following holds:

If $L \equiv q(\vec{u})$, then $\sigma(q) \leq \sigma(p)$   1.

If $L \equiv \neg q(\vec{u})$, then $\sigma(q) < \sigma(p)$   2.

The set of policy language constructs are designed to be minimal. It is therefore useful to define some syntactically sugared abbreviations. For example, the equality sign (=) can be used as a built-in predicate, as syntactic equality can be defined as a rule. Furthermore, in the body of a rule, negation is allowed not just in front of a single atom, but also in front of a possibly existentially quantified conjunction of static atoms. Similarly, the guard (e.g. update condition $A_2$ above) in an update can also be an optionally existentially quantified conjunction of static literals. Each occurrence of such an abbreviation can be expanded at the expense of introducing a new intensional predicate name and a rule. For example, $p(x) \leftarrow \neg \exists y,z(q(x,y),r(z))$ (which is read as p(x) is true if there does not exist a y and z for which q(x,y) is true and r(z) is true) is an abbreviation for the two rules $p(x) \leftarrow \neg \alpha(x)$ (i.e. p(x) is true if α(x) is not true) and $\alpha(x) \leftarrow q(x,y),r(z)$ (i.e. α(x) is true is q(x,y) is true and r(z) is true). Similarly, $\pm p(\vec{t})$ is an abbreviation for $\pm \{p(\vec{x}): \vec{x}=\vec{t}\}$.

In authorization systems, the effects of actions are preferably finite and deterministic; in other words, only finitely many atoms in the state are affected by an action, and which atoms are affected only depends on the action parameters and the current state. To achieve this, a syntactic safety condition is defined to rule out policies that would cause infinite or non-deterministic effects (e.g. rules such as $\alpha(\ ) \leftarrow +q(x)$, which would insert q(x) for all possible instantiations of x; or $\alpha(\ ) \leftarrow -p(x),+q(x)$, where the effect depends on the choice of how p(x) is proven).

A static rule is safe if the following holds: (i) any variable in the head occurs in a positive atom in the body; and (ii) any variable in a negated body atom occurs in a preceding (further to the left) positive atom in the body.

A dynamic rule is safe if the following holds: (iii) any free variable in a dynamic literal in the body occurs in the head; (iv) any variable in a negated body atom occurs in the head or in a preceding (further to the left) positive atom in the body; and (v) for all elementary updates $\pm \{A_1:A_2\}$ in the body, the free variables of $A_1$ are a subset of or equal to the free variables of $A_2$ (i.e. $fv(A_1) \subseteq fv(A_2)$). A policy P is safe if all its rules are safe, and if for all dynamic rules $p(\vec{t}) \leftarrow \vec{A}$ in P, there is no other rule in P with p in its head.

Requirement (i) ensures a finite number of ground answers for positive static atoms. Together with (v), this ensures that each elementary update inserts or retracts only a finite number of ground state atoms. Requirements (ii) and (iv) ensure that negation is non-floundering, i.e. the negated atom is fully instantiated when it is evaluated (assuming a left-to-right order). Finally, requirement (iii), together with the restriction that a policy can hold at most one definition for each dynamic predicate, guarantees that the side effects caused by a successful action request are unique and deterministic.

To illustrate the above-described state-updating policy language, several examples are presented below. In a first example, a user can activate or deactivate a role in a secure system. For example, a user can activate or deactivate themselves as a supervisor, giving certain permissions in the system. This can be achieved using the following rules:

act(x,r)←canAct(x,r),¬hasAct(x,r),+hasAct(x,r)

deact(x,r)←canDeact(x,r),hasAct(x,r),−hasAct(x,r)

In the case of the act(x,r) rule, a user x is activated for role r. This role can be activated for this user if x is authorized to activate role r (as given by atom canAct (x,r)), has not previously been activated as r (as given by atom ¬hasAct(x,r), which is an extensional atom in the authorization state), and, if these two access conditions are met, the fact that the user x is activated for role r is added to the state (by dynamic literal +hasAct(x,r) adding the hasAct(x,r) fact to the authorization state).

The deact(x,r) rule operates in a similar fashion. The role can be deactivated for this user if x is authorized to deactivate r (as given by atom canDeact(x,r)), has previously been activated as r (as given by extensional atom hasAct(x,r)), and, if these two access conditions are met, the fact that the user x is activated for role r is retracted from the state (by dynamic literal −hasAct(x,r) removing the hasAct(x,r) fact from the authorization state).

More complex deactivation rules can also be constructed by using the conditional bulk update feature. For example, if a user is deactivated from a supervisor role, then it can be desirable to automatically deactivate all other users having a related, e.g. subordinate, role. This is known as cascading role revocation, and specifies automated deactivation of roles triggered by user-induced role deactivation. This is achieved using the following rule:

deact(x,r)←canDeact(x,r),hasAct(x,r), −{hasAct(x′,r′):
   isDeact(x′,r′,x,r)},−hasAct(x,r)

If, for example, a user x is deactivated from a supervisor role, then it can be desirable to automatically deactivate all student roles. In this case the isDeact(x',r',x,r) static atom is defined as follows:

$$\text{isDeact}(x',\text{Stu},x,\text{Supvsr}) \leftarrow \text{hasAct}(x',\text{Stu}), \text{hasAct}(x, \text{Supvsr})$$

Therefore, the deact(x,r) rule above checks the conditions that x is authorized to deactivate r (as given by atom canDeact (x,r)) and has previously been activated as r (as given by extensional atom hasAct(x,r)). If these conditions are met, then the conditional bulk update (−{hasAct(x',r'): isDeact(x', r',x,r)) removes all role r' entries in the authorization state for users x' for which isDeact(x',r',x,r) is true. Therefore, isDeact (x',r',x,r) is the update condition. For the example isDeact rule above, this is true for all x' that are students and x is a supervisor. Finally, the fact that the user x is activated for role r is retracted from the state (by dynamic literal −hasAct(x,r) removing the hasAct(x,r) fact from the authorization state).

Another example involves 'separation of duty' (SoD) policies. SoD policies come in many variants, many of which depend on the authorization state. Below is an example of dynamic history-based SoD. A first rule below states that managers can initiate payments that have not yet been initiated.

$$\text{init}(x,p) \leftarrow \text{isMgr}(x), \neg \exists y(\text{initiated}(y,p)), +\text{initiated}(x,p)$$

In this example, the dynamic predicate init is used for the action of initiating the payment, and extensional predicate initiated is used to record successful payment initiations in the authorization state. The rule checks that user x is a manager (using atom isMgr(x)) and that there does not exist some user y that has already initiated payment p (using negated atom ¬∃y(initiated(y,p)). If these conditions are met, the initiated fact for x and p is inserted into the authorization state (+initiated(x,p)). Note that this rule utilizes stratified negation.

A second SoD rule can enable cancellation of payments if they have not yet been authorized, as follows:

$$\text{cancel}(x,p) \leftarrow \text{isMgr}(x), \text{initiated}(y,p), \neg \exists(\text{authorised}(z, p)), -\{\text{initiated}(v,w): w=p, \text{initiated}(v,w)\}$$

This checks that x is a manager, that p has already been initiated by some user y, and there does not exist some user z which has already authorized p. If this is the case, then a conditional bulk update is used to retract all initiations from the state for which the payment is p.

A third SoD rule enables managers to authorize payments that were not initiated by themselves. This is defined as follows:

$$\text{auth}(x,p) \leftarrow \text{isMgr}(x), \neg \exists(\text{authorised}(z,p)), \text{initiated}(y,p), \neg \text{initiated}(x,p), +\text{authorised}(x,p)$$

This rule checks that x is a manager, that payment p has not previously been authorized, that some user y has initiated payment p, and that x has not initiated payment p. Then, the fact that x has authorized the payment p is inserted into the authorization state.

A further example considers appointment polices. For example, an action app(x,y,r) can allow a user x to appoint a user y to a role r. This rule can be defined by:

$$\text{app}(x,y,r) \leftarrow \text{canApp}(x,y,r), \neg \exists x'(\text{hasApp}(x',y,r)), +\text{hasApp}(x,y,r)$$

This rule checks that user x can appoint user y to role r, and that user y has not previously been appointed to role r by some user x'. The appointment of user y to role r by x is then recorded in the authorization state. The hasApp predicate can then be used as a precondition for activating roles, as illustrated above, for example as in the rule canAct(x,r)←hasApp (y,x,r).

Appointments can be revoked with an unapp predicate, as in the rule below:

$$\text{unapp}(x,y,r) \leftarrow \text{canUnapp}(x,y,r), \text{hasApp}(x',y,r), -\{\text{hasApp}(u,v,w): v=y, w=r, \text{hasApp}(u,v,w)\}$$

In this rule, user x un-appoints user y from role r, if x is authorized to do so (canUnapp(x,y,r) holds true) and y has previously been appointed to r by some user (hasApp(x',y,r) holds). This rule then uses the conditional bulk update feature to remove all hasApp(u,v,w) atoms from the state for which v=y, w=r and hasApp(u,v,w) is true. In other words, user y's role r is removed from the authorization state, regardless of which user appointed y to the role.

To transitively revoke appointments made by revoked appointees, the unapp action from above can be used as a module to compose a new action, below:

$$\text{unappTrans}(x,y,r) \leftarrow \text{unapp}(x,y,r), -\{\text{hasApp}(u,v,w): w=r, \text{hasAppTrans}(y,v,w), \text{hasApp}(u,v,w)\}$$

This rule therefore nests the unapp predicate, defined previously, within the unappTrans rule. The unapp predicate is itself updating the authorization state, and is called as part of another rule. This is known as a nested action definition. This rule therefore firstly checks that x can un-appoint y from r (the evaluation of which has the side-effect of updating the authorization state to remove y's role). If this holds true, then the conditional bulk update removes all hasApp(u,v,w) atoms from the state for which w=r and hasAppTrans(y,v,w) and hasApp(u,v,w) is true. In other words, the conditional bulk update in unappTrans removes all appointments to r transitively reachable starting from user y from the authorization state. For example, if A has appointed B, B has appointed C, and C has appointed D and E in role R, then if A transitively un-appoints B by performing the action unappTrans(A,B,R), all appointments above are revoked. The hasAppTrans predicate is defined to capture all appointments transitively made by a principal:

$$\text{hasAppTrans}(x,y,r) \leftarrow \text{hasApp}(x,y,r)$$

$$\text{hasAppTrans}(x,y,r) \leftarrow \text{hasAppTrans}(x,y',r), \text{hasApp}(y',y,r)$$

The evaluation of the unappTrans rule with nested action definitions has implications on the point in time at which the authorization state is updated. When a nested action definition comprises a command to update the authorization state, it is ensured that the nested action is evaluated, but the effects on the authorization state are not committed (i.e. externally visible) until the end, after the top-level rule calling the nested action has also been evaluated successfully. This avoids changes being made to the authorization state in a called rule, but then the calling rule not completing successfully. This means that all side effects of an action request are atomic, such that if the deduction process for a request fails midway, all intermediate updates are rolled back.

A further example considers the concept of 'sealed envelope' policies. A sealed envelope can be used to constrain access to certain data. For example, in a health record system, a patient can hide data from a clinician who would otherwise have read access, by putting the item into a digital sealed envelope. This can be represented by the following policy:

$$\text{canRead}(x,o) \leftarrow \neg \text{sealed}(x,o)$$

$$\text{seal}(x,y,o) \leftarrow \text{canSeal}(x,y,o), +\text{sealed}(y,o)$$

Therefore, a user x can read an object o if it is not sealed. Similarly, a user x can seal an object o from access by user y if they are authorized to do so, in which case the sealed fact is added to the authorization state.

A final example illustrates the flexibility of the policy language in defining the conditions that are applied to action definitions. The previous examples comprised preconditions, i.e. constraints that have to be satisfied prior to performing the authorization state updates. However, in some cases, especially when an action is composed of several other actions, it is useful to have a postcondition (or intermediate conditions) on the updates in the rule. In the example below, doAcn1 first calls doAcn2 and doAcn3 which are defined somewhere else, and then (as the postcondition) checks that everyone who is a manager also is a user (a containment property, requiring nested stratified negation). If the postcondition fails, the entire action aborts with no effect on the state (due to atomic updates).

doAcn1(x,o)←doAcn2(x,o),doAcn3(x,o),¬notOK( )

notOK( )←isMgr(x),¬isUsr(x)

Figure 5:
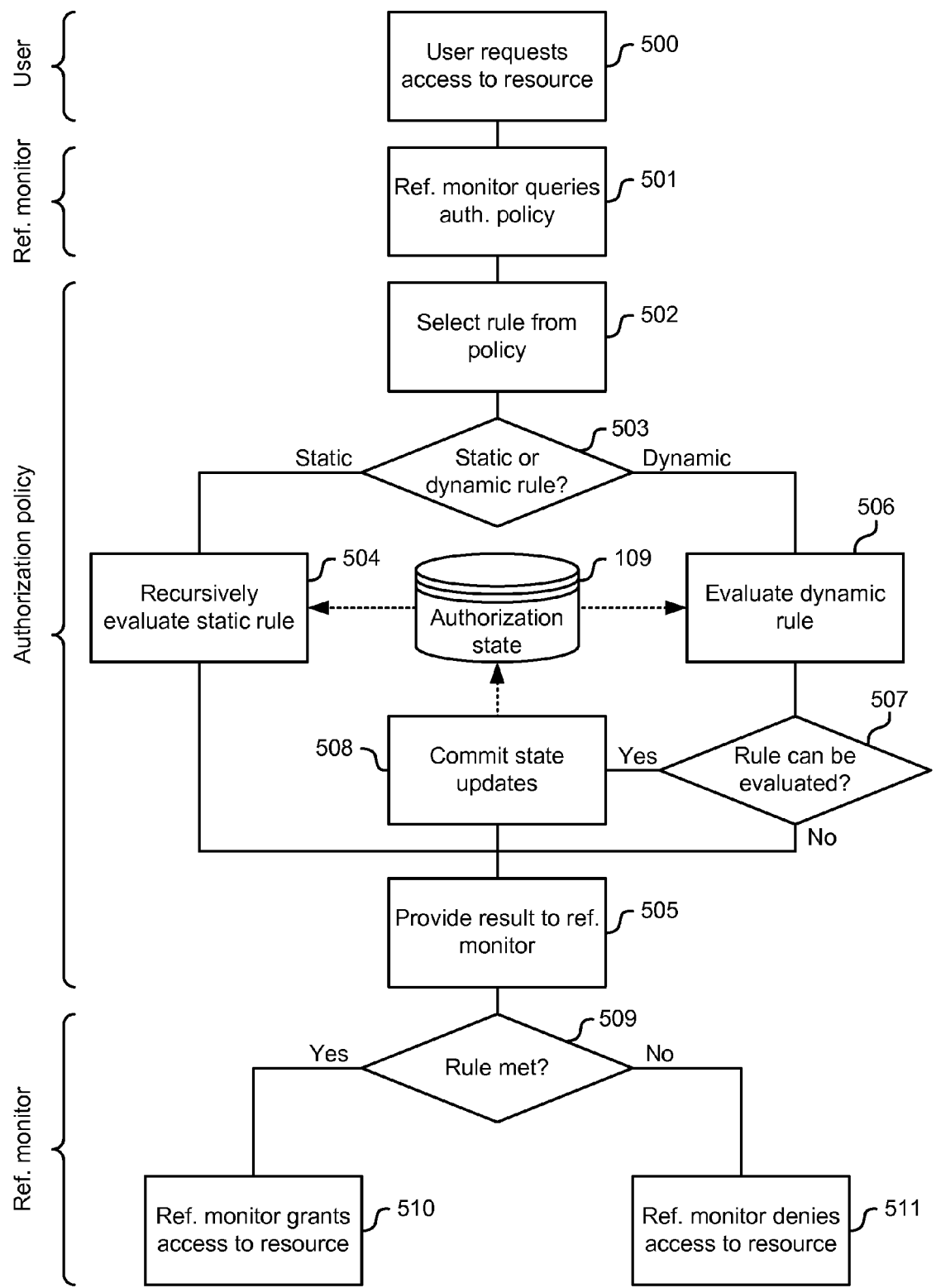
FIG. 5 illustrates a flowchart showing the operation of the state-updating authorization policy.

Reference is now made to FIG. 5, which illustrates a flowchart of the overall operation of the authorization system when using a state-updating authorization policy, such as that outlined hereinabove.

Firstly, the user 100 uses the user terminal 101 to make a request 500 for access to the resource 103. This request can be, for example, to initiate a payment, activate a role, or read an object, as outlined above. The reference monitor 107 receives the request and queries 501 the authorization policy 110 on the authorization node 108.

Upon receiving the query, the authorization node 108 selects 502 the appropriate rule from the policy for determining whether to grant access to the user 100. If it is determined 503 that the selected rule is a static rule (i.e. one that does not update the authorization state), then the static rule is evaluated recursively 504, utilizing data from the authorization state 109 to do so. Once the static rule has been evaluated, the results (the true or false value of the head of the rule) are provided 505 to the reference monitor.

If, however, the rule is a dynamic rule, then the literals for the dynamic rule are evaluated 506, using the authorization state 109. This also includes the evaluation of any nested rules within the dynamic rule. State updates are internally performed at this stage, as the rules are evaluated. However, state updates are not committed such that they are externally visible at this stage. Rather, it is first determined 507 whether the rule (i.e. the top-level query) evaluates to true. If so, then the authorization state updates are committed 508 (i.e. atomic state updates are performed), and the result of the evaluation (true in this case) provided 505 to the reference monitor 107. If not, then authorization state updates are not committed, and the result (false in this case) provided 505 to the reference monitor 107.

The reference monitor 107 reads the result of the rule evaluation to determine 509 whether the rule holds. If the conditions of the rule were met and the rule holds, then the reference monitor 107 grants 510 access to the resource 103 to the user 100. If, however, the conditions of the rule were not met and the rule does not hold, then the reference monitor 107 denies 511 access to the resource 103 to the user 100.

For completeness, a description of the policy language semantics and a proof system for the language are now provided. The policy language is based on transaction logic (TR), an extension of first order logic that can handle negation as failure, has a notion of state and supports transactional state updates. Translating a rule into a TR formula is performed as follows: all free variables of the rule are universally quantified at the outer-most level, and each conjunction symbol (',') is replaced by the sequential operator $\otimes$ from TR. This ensures that multiple elementary updates are executed sequentially and from left to right. In TR, there are no predefined elementary updates. Instead, TR is parameterized by a 'transition oracle' $trans_p$, a function from pairs of states to sets of closed elementary updates. To complete the translation into TR, an instance of such a transition oracle that specifies the meaning of $\pm\{A_1:A_2\}$ is defined, as below.

Let $P^{st}$ be the set of static rules in a policy P. The statement $B \models_p^{st} L$ can be written iff the ground static literal L is entailed by $P^{st}$ and B (according to the standard stratified Datalog semantics). The transition oracle $trans_p$ is defined as the smallest function satisfying the following equations, where $\pm\{A_1:A_2\}$ below is closed:

$$+\{A_1:A_2\} \in trans_p(B,B') \text{ iff } B'=B \cup \{A_1:B'^{st}_p A_2\}$$

$$-\{A_1:A_2\} \in trans_p(B,B') \text{ iff } B'=B \setminus \{A_1:B'^{st}_p A_2\}$$

The embedding into TR provides the authorization policy language with a model theory, an operational semantics, and various options for extending the language.

A proof system for the state-updating authorization language is provided below. This defines judgements of the form $P, B_0, \ldots, B_n \vdash \vec{L}$, expressing the fact that the sequence of ground literals $\vec{L}$ can be executed in the context of policy P, starting from the initial state $B_0$ and terminating in state $B_n$. In the proof system below, if the statement on the top holds true, then the bottom statement is true.

$$(STA) \frac{B^{\cdot}_p{}^{st} L \ L \text{ is ground and static}}{P, B \ L}$$

$$(DYN) \frac{P, \vec{B} \ \vec{L} \ A \leftarrow \vec{L} \text{ is a closed instance of a dynamic rule in } P}{P, \vec{B} \ A}$$

$$(UPD) \frac{L \in trans_p(B_0, B_1)}{P, B_0, B_1 \ L}$$

$$(EMP) \frac{}{P, B \ []}$$

$$(SEQ) \frac{P, B_0, \ldots, B_m \ L \ P, B_m, \ldots, B_n \ \vec{L} \ 0 \le m \le n}{P, B_0, \ldots, B_n \ L, \vec{L}}$$

Where (STA) stands for static, (DYN) stands for dynamic, (UPD) stands for update, (EMP) stands for empty, and (SEQ) stands for sequence. As an explanatory example, consider the SoD example described above. Starting from the initial authorization state $B_0=\{isMgr(A), isMgr(B), initiated(A,P)\}$, the action auth(A,P) fails because ¬initiated(A,P) does not hold in $B_0$. However, the sequence of actions $\vec{L}$=cancel(A,P), init(B,P), auth(A,P) does succeed. By the proof rules, P, $B_0$, $B_1$, $B_2$, $B_3$ \L, where $B_1=B_0\setminus\{initiated(A,P)\}$ (as a result of the cancel(A,P) rule), $B_2=B_1 \cup\{initiated(B,P)\}$ (as a result of the init(B,P) rule), and the final state $B_3=B_2 \cup\{authorized(A,P)\}$ (as a result of the auth(A,P) rule).

Figure 6:
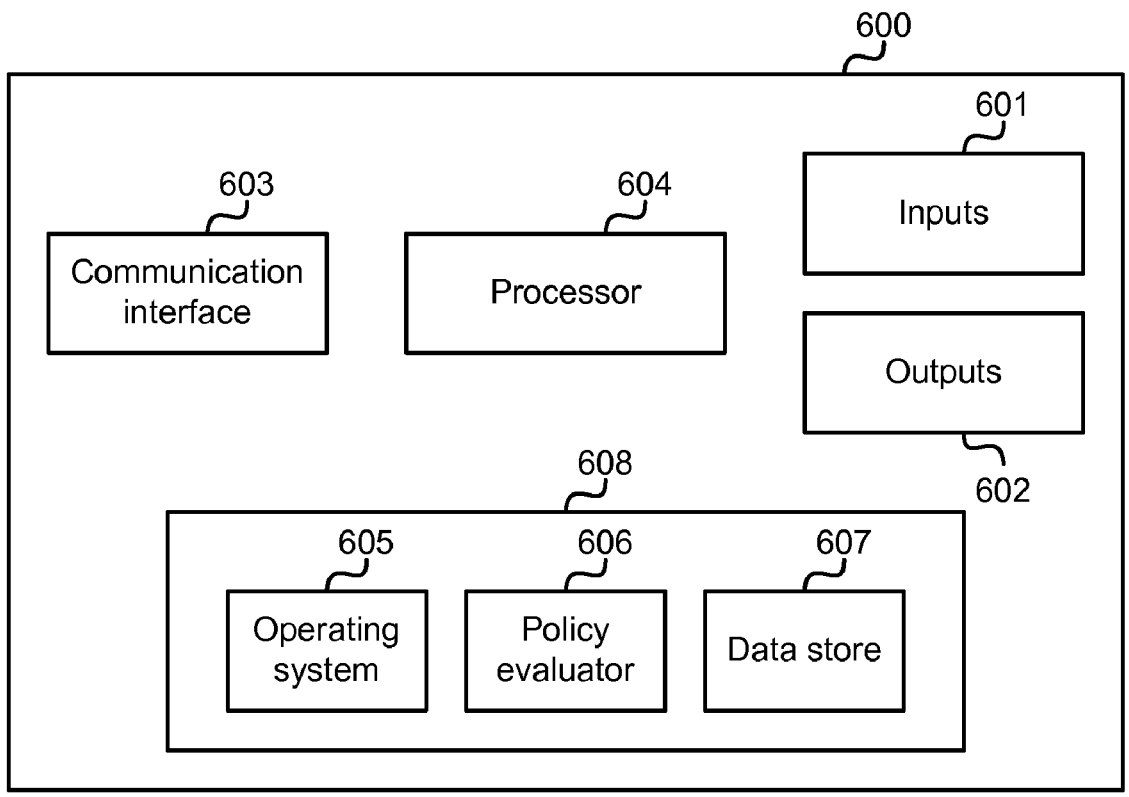
FIG. 6 illustrates an exemplary computing-based device in which embodiments of a state-updating authorization policy can be implemented.

Reference is now made to FIG. 6, which illustrates various components of an exemplary computing-based device 600 which can be implemented as any form of a computing and/or electronic device, and in which embodiments of a state-updating authorization policy can be implemented. The exemplary computing-based device 600 can implement the authorization node 108.

The computing-based device 600 comprises one or more inputs 601 which are of any suitable type for receiving input such as from the administrator terminal 112. An output 602 is also provided such as data and/or video output to the administrator terminal in communication with the computing-based device. The output can provide a graphical user interface, or other user interface of any suitable type although this is not essential. The device also comprises communication interface 603 suitable for communicating with other elements of the authorization system, such as the reference monitor and authorization state database.

Computing-based device 600 also comprises one or more processors 604 which can be microprocessors, controllers or any other suitable type of processors for processing computing executable instructions to control the operation of the device in order to evaluate the authorization policy. Platform software comprising an operating system 605 or any other suitable platform software can be provided at the computing-based device 600 to enable policy evaluator software 606 to be executed on the device. A data store 607 can be provided to store the authorization policy, and other data such as intermediate results and pending state updates.

The computer executable instructions can be provided using any computer-readable media, such as memory 608. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An authorization system, comprising:
an authorization node executing an authorization policy;
a storage device storing an authorization state associated with the authorization policy and comprising a plurality of entries; and
a reference monitor arranged to receive a request for access to a secured resource and query the authorization policy responsive thereto,
wherein the authorization policy comprises:
a dynamic rule having at least one access condition for determining whether to grant access to the secured resource, and the dynamic rule is configured to update each entry of the plurality of entries in the authorization state for which an update condition is met and retract each entry of the plurality of entries in the authorization state for which an update condition is not met at substantially the same time, wherein:
the update condition is defined separately from the at least one access condition; and
the at least one access condition includes one or more dynamic literals defining a body of the dynamic rule and enabling nested actions.

2. An authorization system according to claim 1, wherein the at least one access condition comprises a further rule.

3. An authorization system according to claim 2, wherein the further rule further updates the authorization state.

4. An authorization system according to claim 1, wherein the authorization state is updated after performing a top-level query of each of the one or more dynamic literals which are nested in the dynamic rule.

5. An authorization system according to claim 1, wherein the at least one access condition recursively calls the rule.

6. An authorization system according to claim 1, wherein the at least one access condition comprises an intensional predicate.

7. An authorization system according to claim 1, wherein the at least one access condition comprises a negated predicate such that the access condition is met if the predicate cannot be deduced.

8. An authorization system according to claim 1, wherein updating all the entries in the authorization state for which the update condition is met comprises one of:
   inserting a fact into all the entries in the authorization state for which the update condition is met; or
   retracting a fact from all the entries in the authorization state for which the update condition is met.

9. An authorization system according to claim 1, wherein the dynamic rule is defined by a plurality of conjoined literals, wherein at least one of the literals defines the at least one access condition, and a further literal defines a command to update all the entries in the authorization state for which the update condition is met.

10. An authorization system according to claim 9, wherein the further literal comprises an extensional predicate.

11. An authorization system according to claim 1, wherein the rule is stratified.

12. An authorization system according to claim 1, wherein the authorization policy is defined using a recursive authorization policy language.

13. An authorization system according to claim 1, wherein the storage device is a database.

14. An authorization system according to claim 13, wherein the database is an extensional database.

15. An authorization method performed at an authorization node executing an authorization policy, comprising:
   receiving a query from a resource monitor requesting authorization of a request for access to a secure resource;
   accessing a storage device storing an authorization state associated with the authorization policy and comprising a plurality of entries;
   selecting a dynamic rule from the authorization policy based on the received query, wherein the dynamic rule comprises at least one access condition for determining whether to grant access to the secured resource and an update command, wherein the at least one access condition comprises one or more dynamic literals defining a body of the dynamic rule;
   evaluating the at least one access condition of the dynamic rule using the query and at least one entry of the authorization state;
   determining a response to the query based on the evaluating, the response comprising an approval in the event that the at least one access condition is met and a denial in the event that the at least one access condition is not met; and
   executing the update command, such that updates to each evaluated entry in the authorization state that meets an update condition are committed simultaneously in the authorization state after performing a top-level query, wherein the update condition is defined separately from the at least one access condition.

16. A method according to claim 15, wherein executing the update command is performed subsequent to determining that each access condition of the dynamic rule is met.

17. A method according to claim 15, further comprising checking that the dynamic rule is syntactically safe.

18. A method according to claim 17, wherein checking that the dynamic rule is syntactically safe comprises determining whether a set of variables defining the entries in the authorization state are a subset of a set of variables used in the update condition.

19. A method according to claim 15, further comprising sending the response to the reference monitor to.

* * * * *